United States Patent [19]

Harris

[11] Patent Number: 6,167,028
[45] Date of Patent: Dec. 26, 2000

[54] METHODS AND APPARATUS FOR FACILITATING TRANSMISSION OF CELLS HAVING MULTIPLE PRIORITIES IN A CELL RELAY NETWORK

[75] Inventor: Jeffrey Martin Harris, Chandler, Ariz.

[73] Assignee: Motorola, Inc., Schaumburg, Ill.

[21] Appl. No.: 09/088,015

[22] Filed: Jun. 1, 1998

[51] Int. Cl.[7] .............................. G06F 11/00; H04L 12/56
[52] U.S. Cl. ......................... 370/230; 370/395; 370/409; 340/825.5
[58] Field of Search ..................................... 370/230, 231, 370/232, 236, 235, 409, 412, 352, 397, 398, 395; 340/825.5, 825.51; 714/749

[56] References Cited

U.S. PATENT DOCUMENTS

| | | | |
|---|---|---|---|
| 5,313,454 | 5/1994 | Bustini et al. | 370/13 |
| 5,335,222 | 8/1994 | Kamoi et al. | 370/60 |
| 5,490,141 | 2/1996 | Lai et al. | 370/60.1 |
| 5,530,695 | 6/1996 | Dighe et al. | 370/17 |
| 5,648,958 | 7/1997 | Counterman | 370/458 |
| 5,717,689 | 2/1998 | Ayanoglu | 370/349 |
| 5,726,987 | 3/1998 | Uriu et al. | 370/395 |
| 5,867,494 | 2/1999 | Krishnaswamy et al. | 370/352 |
| 5,875,173 | 2/1999 | Ohgane et al. | 370/230 |
| 5,999,525 | 12/1999 | Krishnaswamy et al. | 370/352 |
| 6,002,667 | 12/1999 | Manning et al. | 370/232 |

OTHER PUBLICATIONS

An article entitled "B–ISDN Application Protocols for Access Signalling" from International Telecommunication Union, (Feb. 1995), pp. 10 and 13.

*Primary Examiner*—Alpus H. Hsu
*Assistant Examiner*—Afsar M. Qureshi
*Attorney, Agent, or Firm*—Jennifer B. Wuamett; Frank J. Bogacz

[57] ABSTRACT

A cell relay network (38, FIG. 2) transmits cells having different priorities through a single virtual connection using several methods (100, FIG. 4; 200, FIG. 5; 300, FIG. 3). Congestion control is accomplished by a negotiation process between a network user's communication equipment at a source node (900, FIG. 9) and a network control element (1000, FIG. 10) associated with the network fabric 18 at the time of connection set-up. A source node (900) initially transmits a request for a connection to the network control element (1000). Along with a connection request, the source node also transmits a requisition for permission to transfer through the network during a predetermined time interval cells having multiple priorities. The network control element responds to the requisition by sending to the source node a connection admissions attributes message (44, FIG. 2) containing allowable connection attributes. The source node enforces the connection attributes authorized by the network in the connection admission attributes message.

31 Claims, 7 Drawing Sheets

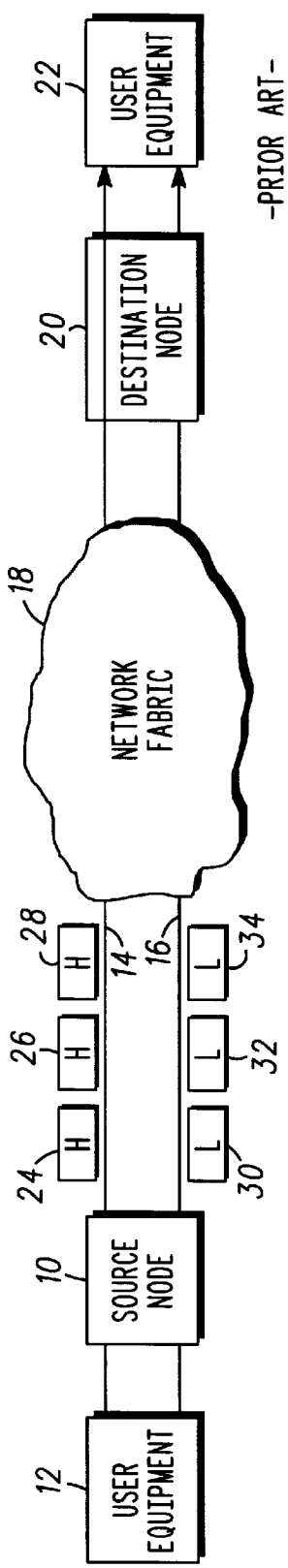
*FIG. 1* —PRIOR ART—
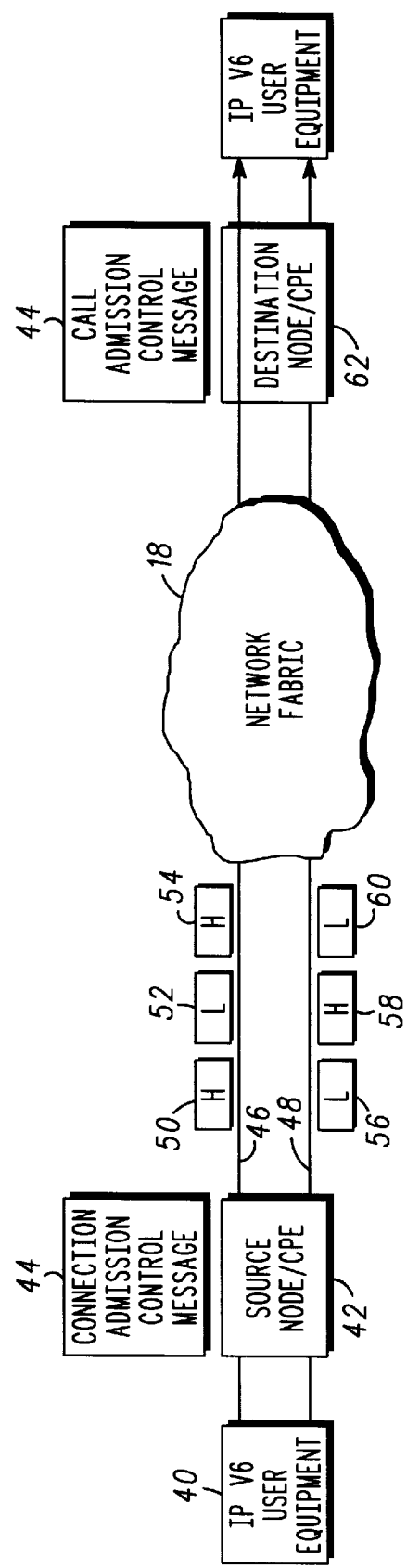
*FIG. 2*

800

METHODS AND APPARATUS FOR FACILITATING TRANSMISSION OF CELLS HAVING MULTIPLE PRIORITIES IN A CELL RELAY NETWORK

FIELD OF THE INVENTION

This invention relates generally to the field of communication systems and networks. More specifically, this invention relates to methods and apparatus for facilitating transmission of cells having multiple priorities in a cell relay network.

BACKGROUND OF THE INVENTION

Cell relay networks use high bandwidth, low-delay, packet-like switching and multiplexing techniques for transferring data across the network using fixed sized cells. An example of such a technique is asynchronous transfer mode (ATM), which is a suite of communication protocols designed as a "best efforts" cell delivery system. The fixed sized cells require lower processing overhead and allow higher transmission speeds than traditional packet switching methods. Each ATM cell contains a payload portion and a header, the latter including a label that associates the cell with a logical communication link between sending and receiving network end systems, i.e., the cell's virtual connection or virtual circuit. Thus, the virtual connection label for an ATM cell forms the basis on which the ATM cell is routed, or switched, at each network node it encounters.

The ATM cells are asynchronous in that ATM cells belonging to the same virtual connection do not necessarily appear in fixed time slots at periodic intervals on the transmission medium. Rather, the position of the ATM cells associated with a particular virtual connection is random and depends upon the activity of the network. Thus, an ATM system can automatically adjust the network capacity to efficiently transfer data having significantly different data rates, such as voice, real-time or store-and-forward computer data, Internet data, video services, and so forth.

To maximize the use of shared network resources in cell relay networks, such as ATM networks, these networks desirably are statistically multiplexed. In statistical multiplexing, a communication link is multiplexed between channels on a probabilistic basis. With a large number of bursty connections, all of the connections can be assigned to the same link with a high probability that they will not all burst information at the same time. If they do burst simultaneously, the burst can be placed in a physical buffer until a free time slot becomes available.

At times, cell relay networks can become congested or oversubscribed. When a network becomes over-subscribed, not all cells can be transported by the network, and consequently some cells are discarded. Discarding of cells is an expected phenomena in a cell relay network and generally is accommodated by labeling each cell with a priority.

When a cell relay network becomes congested or overwhelmed with cells that cannot all be transported simultaneously, the network typically discards cells designated with the lowest priority. If the network is still unable to deliver all remaining cells, it then will discard next highest priority cells presented to it. The discarding process proceeds to continually escalating priority cells until the network is able to transmit the remaining cells. Desirably, the cells designated with the highest priority are guaranteed not to be discarded as a result of congestion. This guarantee is achieved by carefully controlling the amount of high priority traffic admitted to the network. For example, when establishing a virtual connection, the party requesting the connection identifies, at the time of connection set-up, the priority of cells that will pass through the connection through use of quality of service (QoS) parameters included in the set-up message. Each such QoS category corresponds to a priority ranging from a highest priority associated with a guaranteed transmission rate to a lowest priority having no associated transmission rate guarantee.

In prior art networks, a subscriber requesting a connection generally specifies a single priority of cells to be transmitted through the network and also the rate at which such cells will be transmitted. While cells can be sent through a virtual connection at varying rates in prior art networks, the priority of such cells is homogeneous. Such a network, therefore, does not enable a subscriber to transmit cells of different priorities through a single virtual connection. Thus, such a network limits the ability to use a virtual connection as a trunk for combining cells of varying priorities.

Such a network also impedes the transmission of traffic using Internet Protocol (IP), particularly with IP version 6 (IPv6), where packets can be designated with up to sixteen different priorities. Therefore, in prior art cell relay networks, a subscriber would need to pay for access to a separate virtual connection for each priority of cell it desires to transmit (necessitating up to sixteen different connections for trunking IPv6 traffic) or subscribe to a single connection which is designated with the highest priority and transmit all traffic over this high priority connection (necessitating overpayment when transmitting low priority traffic over such a connection).

Thus, what is needed are methods and apparatus for facilitating transmission of cells having multiple priorities in a cell relay network through a single virtual connection.

BRIEF DESCRIPTION OF THE DRAWINGS

The invention is described below with particularity in the appended claims. However, other features of the invention will become more apparent and the invention will be best understood by referring to the following detailed description in conjunction with the accompanying drawings in which:

FIG. 1 illustrates a cell relay network adapted to transmit cells of a single priority through a single connection in accordance with the prior art;

FIG. 2 illustrates a cell relay network adapted to transmit cells of different priorities through a single virtual connection in accordance with a preferred embodiment of the present invention;

Figure 3:
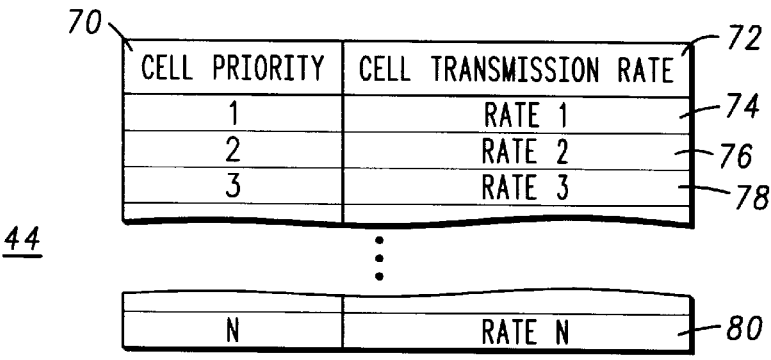
FIG. 3 illustrates a connection admission attributes message for a predetermined time period in accordance with a preferred embodiment of the present invention.

The exemplification set out herein illustrates a preferred embodiment of the invention in one form thereof, and such exemplification is not intended to be construed to be limiting in any manner.

DETAILED DESCRIPTION OF THE DRAWINGS

The present invention provides, among other things, novel methods and apparatus for relaying or transmitting cells having different priorities through a single virtual connection in a cell relay network. The advantages of the present invention are achieved, at least in part, through a negotiation process at the time of connection set-up between a source node or a network user's communication equipment and a network control element associated with the cell relay network.

In a preferred embodiment, a source node initially sends a request to the network control element to establish a connection with a particular destination node. The source node transmits, along with a connection request, a requisition for permission to transfer through the network cells during a predetermined time period cells having multiple priorities. The network control element responds to the requisition by sending to the source node a connection admission attributes message containing allowable connection attributes (typically including a cell transmission rate for each of various specified cell priorities). The source node enforces the authorized connection attributes authorized by the network in the connection admission attributes message.

The methods and apparatus of the present invention enable achievement of congestion control in the network while also allowing trunking and transmission of cells having different priorities in a single virtual connection. The methods and apparatus of the present invention achieve a substantial advantage over prior art methods in which cells having only a single priority are transmitted through a single virtual connection at a specified cell transmission rate for the entire duration of a connection.

The methods and apparatus of the present invention can be used in a terrestrial or satellite-based communication system or a combination of terrestrial and satellite-based systems. Additionally, the methods and apparatus of the present invention can use radio frequency (RF), optical, and/or wire-based networks, or combinations thereof.

FIG. 1 illustrates a cell relay network adapted to transmit cells of a single priority through a single virtual connection in accordance with the prior art. In FIG. 1, source node 10 represents equipment to which one or more items of user equipment 12 is connected (e.g., through a wireless or wire-based connection). Source node 10 is adapted to establish one or more virtual connections 14, 16 through network fabric 18 so as to enable source node 10 to communicate with destination node 20, which also can communicate with one or more item(s) of user equipment 22.

Network fabric 18 can be either a terrestrial wire-based or wireless network of nodes or a satellite-based network, or a combination thereof. Network fabric 18 comprises a network of switching nodes using a cell relay protocol, such as an ATM protocol, for relaying cells through one or more virtual connections 14, 16. As used herein, the terms "connection" and "virtual connection" represent a logical connection not a physical connection. Each cell, such as, for example, cells 24, 26, 28, 30, 32, 34, contains a payload portion and a header (not shown), the latter including a label that associates the cell with a logical communication link between source node 10 and a destination node 20. Such logical connections desirably are evaluated based on how much data can be sent during a time interval, rather than on how long a particular source node will be connected to the network.

Cells transmitted through a cell relay network also can have a designated cell priority loss bit in the header. Typically, at least two priorities, high (H) and low (L) can be designated. In prior art networks, only cells of a single priority can be transmitted through a single virtual connection. Thus, for example, in FIG. 1, connection 14 is shown relaying cells 24, 26, and 28 designated as high priority cells (H), and connection 16 is shown relaying low priority cells 30, 32, and 34, but neither connection 14 nor connection 16 relay both high priority cells 24, 26, 28 and low priority cells 30, 32, and 34.

As discussed above, a cell relay network can, at times, become congested or over-subscribed. When network 18 becomes congested, the network is not able to guarantee the level of QoS (or desired guaranteed priority transmission levels) negotiated with established connections and also may not be able to fulfill QoS requests for new connections. Congestion control is a means for minimizing the effects of network congestion. Congestion control can employ connection admission control procedures and/or usage parameter controls to avoid congestion situations. Prior art cell relay networks typically employ connection admission control procedures to evaluate connection requirements at the time of connection setup, and the network will admit no more high priority traffic than can be guaranteed for the duration of a connection. Such a method works reasonably well with single priority cell traffic. However, this method of congestion control is not optimal for networks relaying IP version 6 (IPv6) traffic or for similar protocols calling for transmission of multiple priority cells.

IPv6 traffic includes datagrams having up to sixteen different priorities for congestion controlled traffic. In order to transmit IPv6 traffic through a prior art cell relay network, a subscriber would need to have sixteen different connections (one for each priority of traffic) or pay for a single high priority connection for transmission of all priorities of traffic, thus causing the subscriber to overpay (unless it plans to transmit only high priority traffic). The present invention overcomes this problem.

FIG. 2 illustrates a cell relay network 38 adapted to transmit cells of different priority through a single virtual connection in accordance with a preferred embodiment of the present invention. One or more types of user equipment 40 capable of generating IPv6 or similar multiple priority traffic is linked in communication with a source node such as source customer premises equipment (CPE) 42.

Source CPE 42 is adapted to negotiate and enforce a connection admission attributes message 44 containing specified connection attributes, including authorized transmission rates for cells of various priorities, thereby enabling cells 50, 52, and 54 having different priorities to be transmitted through a single virtual connection 46, and similarly enabling cells 56, 58, and 60 of different priorities to be transmitted through virtual connection 48. Although only cells of two priorities, high (H) and low (L) are shown in FIG. 2, cells having numerous different priorities (e.g., up to sixteen different priorities where IPv6 traffic is transmitted) could be transmitted through a single virtual connection in accordance with a preferred embodiment of the present invention, as described in further detail with reference to FIGS. 3–6.

Additionally, user equipment 40 could be a single item or type of user equipment (such as a single computer work station) or could be any number and/or type of user equipment capable of generating traffic of varying priorities, which traffic is trunked in source CPE 42 for relay over virtual connection 46 or 48. Also, although two virtual connections 46 and 48 are shown as a link between source CPE 42 and network fabric 18, source CPE 42 could have only a single virtual connection to the network or could have any number of virtual connections, each capable of relaying cells of varying priorities.

Moreover, virtual connections 46 and 48 each are shown as a one-way connection between source CPE 42 and destination CPE 62. However, if source CPE 42 and destination CPE 62 engage in a two-way call, then one or more second connections (not shown) also could be established for cell traffic being relayed from destination CPE 62 to source CPE 42, and a separate connection admission attributes message 44 also could be negotiated and enforced at CPE 62 for such connection.

FIG. 3 illustrates a connection admission attributes message 44 for a predetermined time interval in accordance with a preferred embodiment of the present invention. Connection admission attributes message 44 comprises a data field which, in a preferred embodiment, includes, at least in part, a listing of one or more cell priorities 70 corresponding to a listing of cell transmission rates 72 for cells of each priority. Connection admission attributes message 44 includes entries 74, 76, 78, and 80 each specifying a cell priority and a transmission rate range for each different priority of cell that is expected to be transmitted into the network during a predetermined time interval over a predetermined time period. The format in which connection admission attributes message is illustrated in FIG. 3 is an exemplary format only and is not intended to be limiting of the scope of the present invention. Connection admission attributes message 44 could appear in a format which varies significantly from that shown in FIG. 3 in terms of structure and/or number of attributes designated in the message without departing from the spirit of the present invention.

Cell transmission rates 72 represent the number of cells of a given priority that are authorized transmission during a particular time interval (T). In a preferred embodiment, time interval (T) is one second, but any time interval could be set by the network as a monitoring interval. In an alternative embodiment, the monitoring time interval (T) could be negotiated between the user and the network without departing from the scope of the present invention.

In a preferred embodiment, the attributes or connection limits authorized and specified in connection admission attributes message 44 are automatically renewable at the end of each monitoring time interval (T) and are valid either until the call or connection ends. In an alternate embodiment, connection admission attributes message 44 could be valid only for some predetermined time period (P), which represents a different (generally longer) time period specified by the network during which the attributes specified in the connection admission attributes message are valid and do not need to be renegotiated (although such attributes could be renegotiated during this time period if desirable). The source node can engage in a renegotiation of the connection admission attributes message if, for example, it determines that it is dropping numerous cells or that excess capacity is available at the source node pursuant to the current attributes in the connection admission attributes message.

Actual priorities and transmission rates specified in connection admission attributes message 44 vary depending on the QoS desired by the source CPE (and/or the destination CPE in some instances). For example, message 44 could contain two entries 74 and 76. Within entry 74, a cell priority listing 70 of "1" could correspond to high priority (H) cells for which the specified transmission rate is 100 cells/time interval (T), and within entry 76, priority listing "2" could correspond to low priority (L) cells for which the specified transmission rate is 1000 cells/time interval (T).

The specified rates represent outer limits of allowable cell transmission from the source node to the network. In the previous example, the source node could transmit up to 100 high priority cells each second (assuming a time interval (T) of one second as in a preferred embodiment) and 100 low priority cells each second over the same virtual connection. Rather than using a static connection admission control procedure of the prior art whereby connection attributes are determined at the beginning of a call (or connection) and cannot be changed during the connection, the present invention allows dynamic connection admission control which can be renegotiated during the duration of a connection.

Connection admission attributes message 44 represents authorized connection attributes resulting from a negotiation process between the source node and a network control element associated with the network, as discussed in further detail below with respect to FIG. 4. Methods for creating connection admission attributes message 44 in the network and for enforcing the authorized connection attributes in a source node are described below in further detail with reference to FIGS. 5 and 6.

Figure 4:
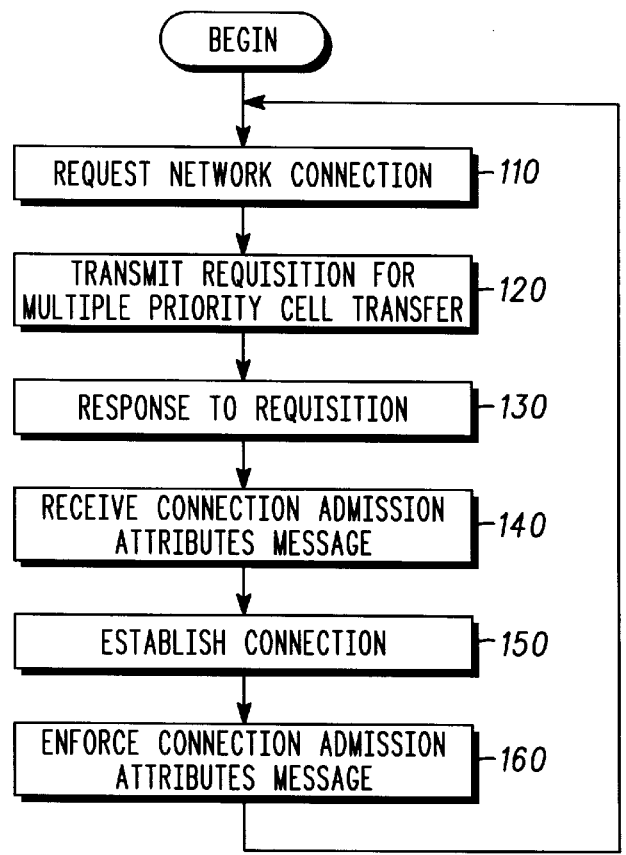
FIG. 4 illustrates a flow chart of a method for facilitating transmission or relay of cells having multiple priorities through a single virtual connection in accordance with a preferred embodiment of the present invention.

FIG. 4 illustrates a flow chart of a method 100 for facilitating transmission or relay of cells having multiple priorities through a single virtual connection in accordance with a preferred embodiment of the present invention. Method 100 begins in step 110 when a source node, such as source CPE 42 (FIG. 2) transmits a request for a connection to the network, desirably to a network control element 1000, as described below with reference to FIG. 10.

In accordance with step 120, the source node also transmits with the connection request a requisition for permission to transfer through the cell relay network during a time interval (T) cells having multiple priorities (e.g., corresponding to varying levels of QoS). In step 130, the network, desirably in network control element 1000 (FIG. 10) receives the connection request and the requisition, and the network processes the connection request and responds to the requisition. Step 130 is described in further detail below with reference to FIG. 5.

In step 140, the source node receives a connection admission attributes message, such as connection admission attributes message 44, in response to the requisition. Connection admission attributes message 44 is intended to prescribe the terms of admission of traffic to the network from the source node for each time interval (T). Desirably, connection admission attributes message 44 contains attributes which are the same as those requested by the source node in the requisition transmitted with the transmission request. However, if the network is congested or over-subscribed at the time of the request, it is possible that the attributes authorized in the connection admission control message will vary from the connection attributes requested in the requisition.

In step 150, a virtual connection is established between the source node and the network using connection set-up procedures known to those of ordinary skill in the art.

In step 160, in establishing and maintaining the virtual connection, the connection attributes authorized pursuant to the connection admission attributes message are enforced by a "trusted agent" desirably residing within the source node. This step represents a significant improvement over the prior art by providing "smart" source node facilities adapted to aid in congestion control. The process of enforcing the connection attributes is described in further detail below with reference to FIG. 6. Method 100 desirably is an iterative process performed over a predetermined time period. Thus, in a preferred embodiment, the process loops back to step 110 after completing step 160. Additionally, step 160 can be ongoing when step 110 is repeated in response to receipt of another request for a network connection.

Figure 5:
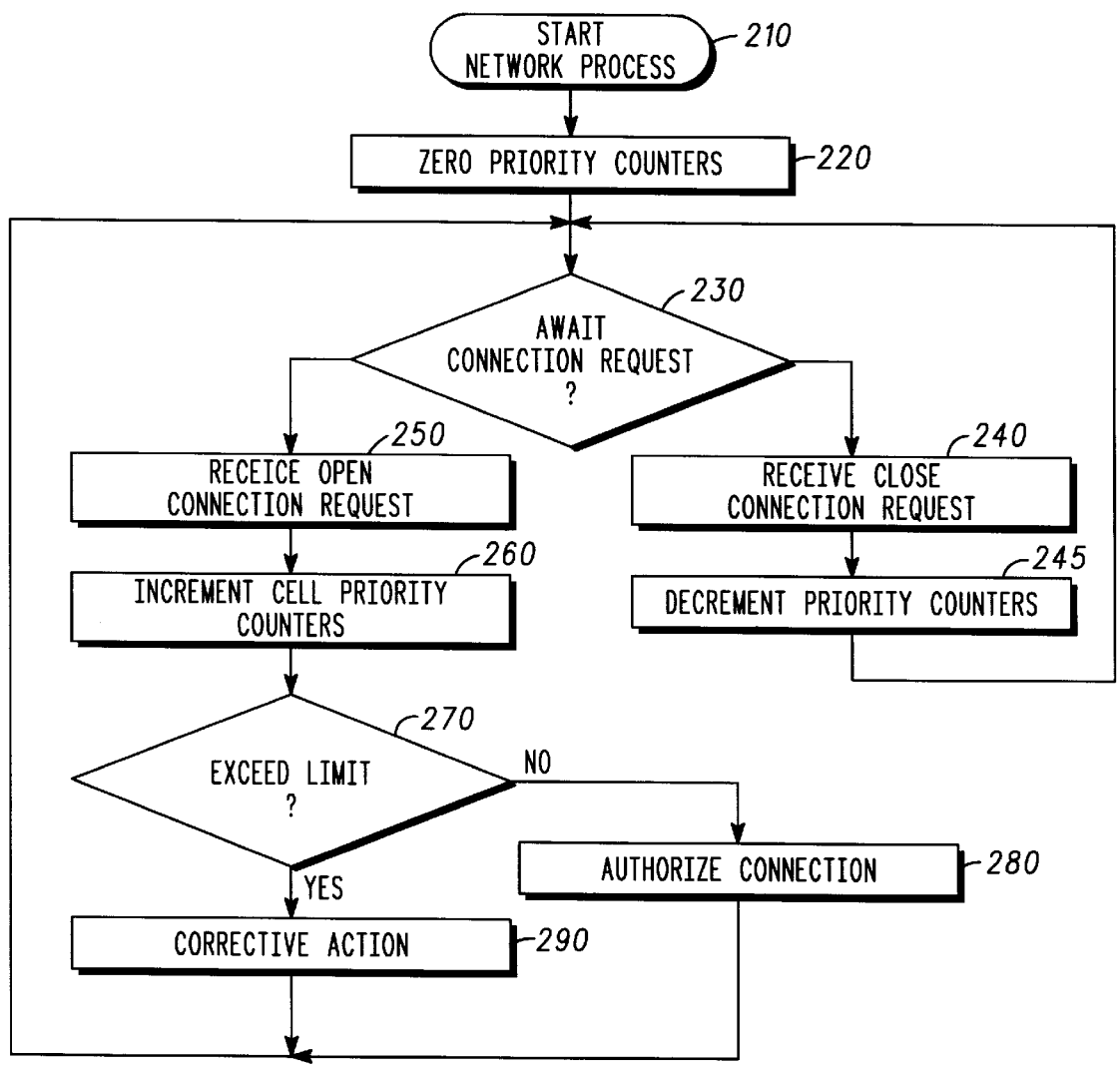
FIG. 5 illustrates a flow chart of a method for creating a connection admission attributes message in a cell relay network in accordance with a preferred embodiment of the present invention.

FIG. 5 illustrates a flow chart of a method for creating a connection admission attributes message in a cell relay network in accordance with a preferred embodiment of the present invention. Method 200 desirably is carried out in the cell relay network in a network control element 1000 (FIG. 10) or similar element adapted to execute one or more algorithms associated with the steps of method 200. Method 200 is employed by the network control element to negotiate and authorize the connection admission attributes.

In a preferred embodiment of the present invention, as discussed in more detail with reference to FIG. 10, the network control element includes one or more priority counters capable of maintaining information concerning the capacity of the network to transmit cells of a given priority during a predetermined time period. Preferably, the network includes a separate priority counter for each possible cell priority designation.

Method 200 begins in step 210, where method 200 is initiated for time interval (T), which represents a monitoring and enforcement interval (but does not necessarily represent the full duration of the time period associated with validity of the message). In step 220, the network priority counters are initialized or set to zero as appropriate. In step 230, method 200 enters an idle stage whereby the network control element awaits receipt of either a request to open a connection ("open connection request") or a request to close a connection ("close connection request").

Method 200 then proceeds to step 240 when the network control element receives a close connection request. In step 245, the network decrements the appropriate priority counter (s) after receiving the close connection request to reflect any increased capacity of the network to relay traffic of a particular priority resulting from the closure of the particular connection. In other words, upon a close connection request event, the connection capacity associated with the closed connection is returned to a resource pool within the network for further allocation. After decrementing the appropriate priority counter(s) in response to the close connection request, the method returns to step 230 to await further connection requests.

Method 200 proceeds from step 230 to step 250 when the network control element receives an open connection request. In a preferred embodiment, the connection requested includes a requisition to relay cells of multiple priorities through the network. In step 260, the network increments the appropriate cell priority counter(s) to decrement capacity needed to support the requested connection from the network's available capacity. In step 270, the network control element examines the decremented capacity and determines whether it is able to support the connection request (e.g., the connection attributes requested in the requisition). In other words, the network control element desirably determines whether sufficient network capacity is available to relay cells at the requested priorities and transmission rates.

If the network control element determines in step 270 that the requisition request exceeds the available capacity limit, then in step 290 the network takes appropriate corrective action. Corrective action can include, for example, denying the connection request or negotiating with the source node to establish acceptable alternative connection attributes (e.g., different priorities and/or transmission rates) from those requested in the requisition.

If, however, in step 270, the network determines that the requisition does not exceed the available capacity of the network (e.g., that capacity is available to support the connection), then the network control element authorizes the connection, and method 200 proceeds to step 280, where the network control element sends a connection admission attributes message 44 (FIG. 3) to the source node.

Figure 6:
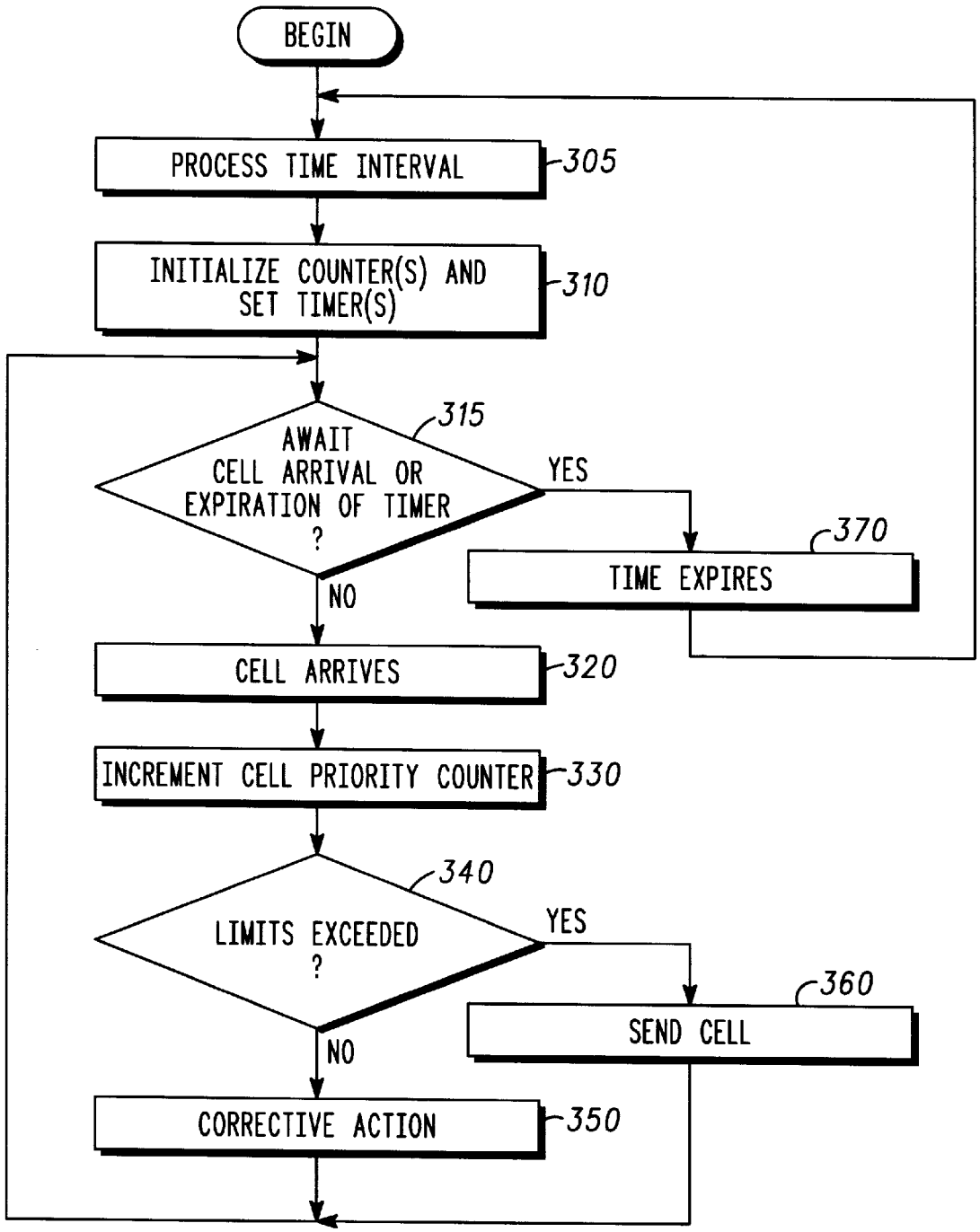
FIG. 6 illustrates a flow chart of a method for enforcing a connection admission attributes message in a source node in accordance with a preferred embodiment of the present invention.

FIG. 6 illustrates a flow chart of a method 300 for enforcing a connection admission attributes message in a source node in accordance with a preferred embodiment of the present invention. In a preferred embodiment of the present invention, method 300 is executed, at least in part, by a "trusted agent" which, in a preferred embodiment, comprises hardware and software located within the source node. The "trusted agent" serves to enforce the limits set in the connection admission attributes message transmitted to the source node in response to a requisition transmitted with the connection request. In an alternative embodiment, method 300 also could be executed by another node of the network.

Method 300 begins in step 305 when the source node initiates method 300 for a predetermined time interval. In step 310, one or more priority counters located within the source node are set to zero (or some other predetermined value). A timer which is responsible for monitoring a predetermined time period during which the connection admission attributes method is to be valid is initialized (e.g., set or reset to zero or some other appropriate value) and is set to time a predetermined time interval. The trusted agent then, in step 315, awaits either an indication that a cell has arrived and is ready for transmission, or an indication that the predetermined time interval for monitoring and enforcing the connection attributes message has expired.

If the trusted agent determines, in step 320, that a cell has arrived and is ready for transmission, the method proceeds to step 330. In step 330, when a cell arrives, the trusted agent determined the cell's priority designation and increments the cell priority counter, or it adds the cell's priority to the current count for that priority. Step 340 then determines whether transmitting the added cell at the designated priority would cause the source node to exceed the limits set in the connection admission attributes message.

If, in step 340, a determination is made that transmitting the cell would cause the source node to exceed the limits of the connection admission attributes message, the method proceeds to step 350 where corrective action is taken. Corrective action could include discarding the cell or transmitting the cell at an available priority other than the priority designation specified in the cell. If, however, in step 340, a determination is made that transmitting the added cell at the designated priority would not cause the source node to exceed the limits of the connection admission attributes message, the method proceeds to step 360 where the cell is transmitted to the network in accordance with its priority designation. The process then loops back to step 315.

If, in step 315, the trusted agent receives an indication that the time interval has expired, the method proceeds to step 370, and the next time interval will then be processed in step 305. The process then loops back to step 305, and the appropriate timer(s) and cell priority counter(s) are reinitialized.

Examples of preferred embodiments of two types of networks in which the methods described above can be practiced are described in further detail below. These examples are provided for illustrative purposes and are not intended to limit the scope of the present invention. As previously noted, methods 100, 200, and 300 described above could be executed in any type of network, including for example, terrestrial networks, satellite-based networks, or a combination thereof.

Figure 7:
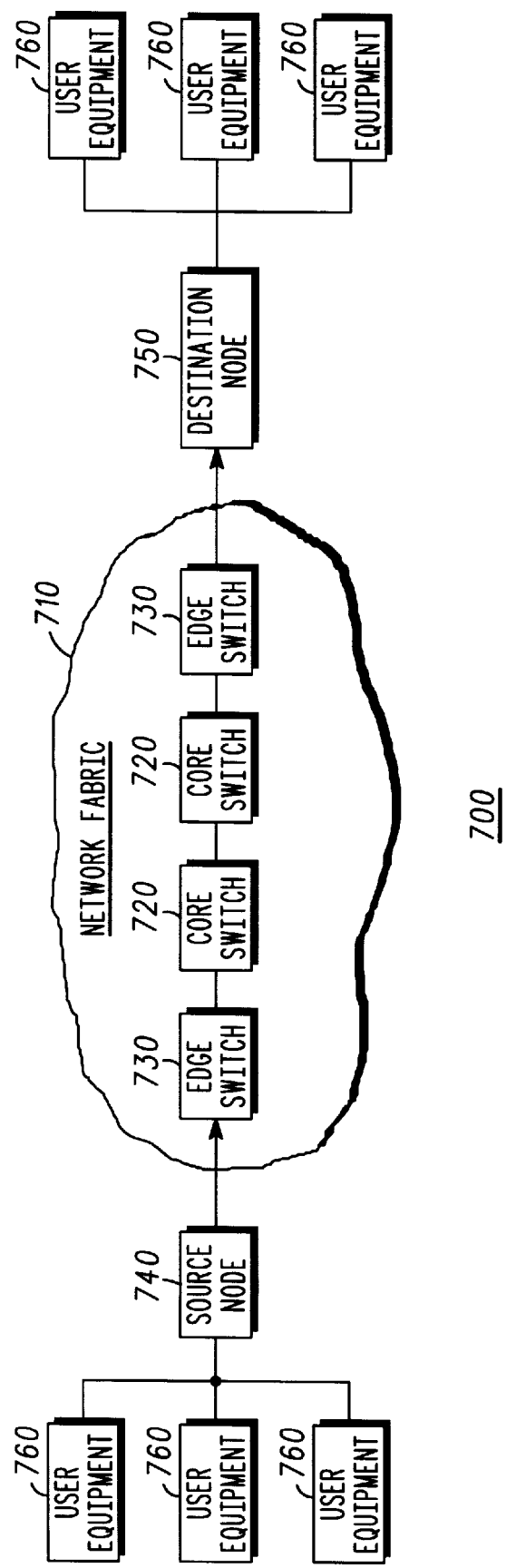
FIG. 7 illustrates a block diagram of a terrestrial communication system in which the methods of the present invention can be implemented.

FIG. 7 illustrates a block diagram of a terrestrial communication system 700 in which the methods of the present invention can be implemented. Terrestrial network 700 generally includes a network fabric comprised of one or more of core switch 720 which serve to relay cells through the network once the cells enter the network through one or more of edge switch 730. Network fabric 710 can be comprised either of wire-based or wireless switches. Core switches 720 can be part of a local or wide area network or can be switches which are external to such a network and simply serve the function of a relay point in a larger network, such as the Internet.

Core switches 720 are responsible for switching high traffic volumes, i.e., many data streams of ATM data cells associated with many virtual circuits. Such switches typically multiplex multiple access switches into higher rate paths, such as OC-48 rates (2.5 gigabits per second). The core switch then is responsible for switching many ATM data streams that can have data rates of 2.5 gigabits per second and higher.

Edge switch 730 could be any node of network fabric 710 which is in communication with a source node 740 or a destination node 750 and which provides source node 740 or destination node 750 with its first point of contact to or from network fabric 710.

Source node 740 and/or destination node 750 can be in communication with any number of items of user equipment 760. Source node 740 can serve to trunk traffic from numerous items of user equipment 760 and to relay such traffic to edge switch 730.

Figure 8:
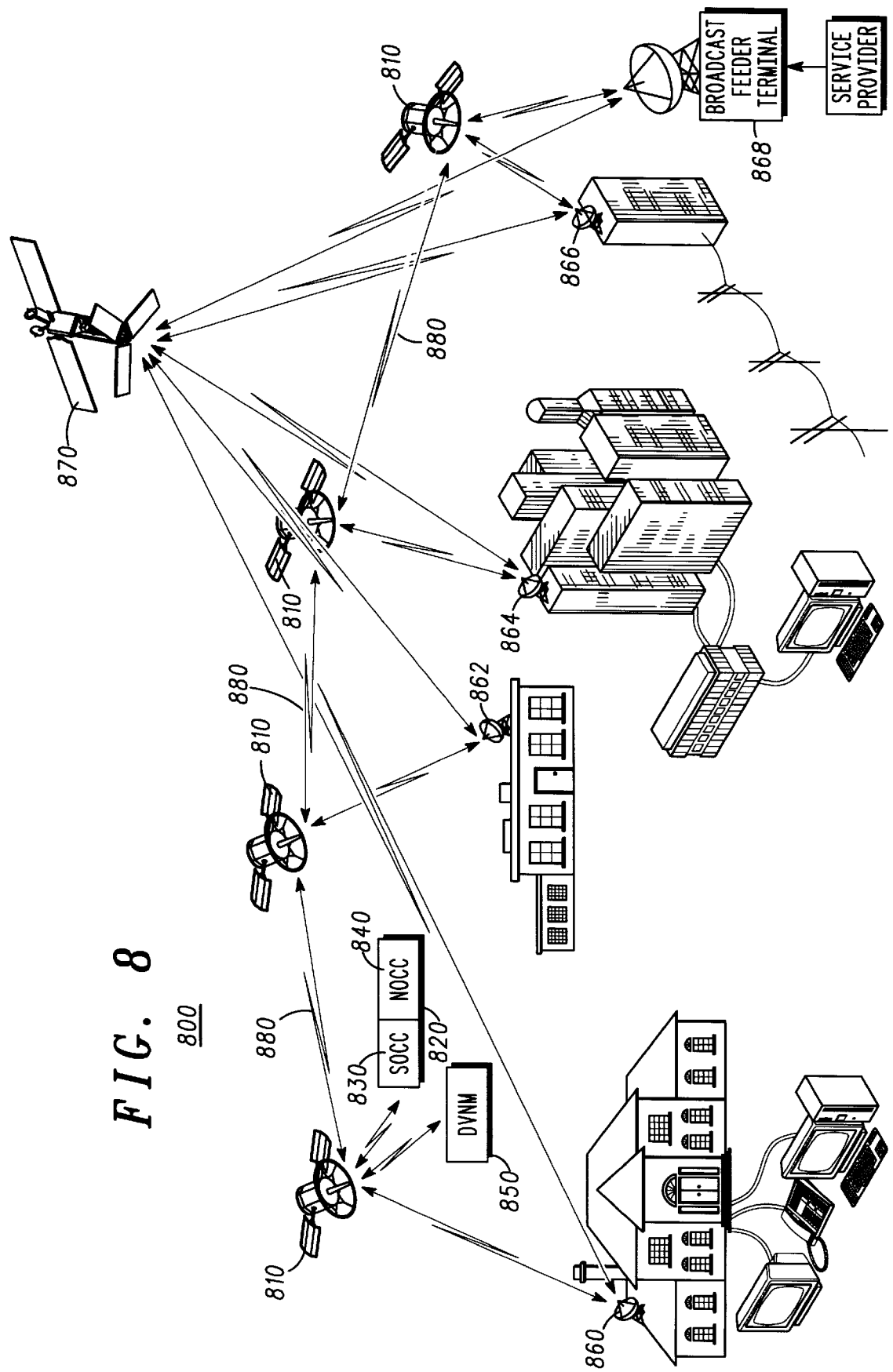
FIG. 8 illustrates a satellite communication system in which the methods of the present invention can be implemented.

FIG. 8 illustrates a satellite communication system 800 in which the present invention can be practiced. In a preferred embodiment, system 800 includes a constellation of satellites 810, one or more mission operation control centers (MOCC) 820, each of which includes a satellite operation control center (SOCC) 830 and a network operation control center (NOCC) 840, one or more distributed virtual network managers (DVNM) 850, and at least one type of source CPE, as represented by home terminal 860, small business terminal 862, corporate terminal 864, gateway terminal 866, and broadcast feeder terminal 868.

In a preferred embodiment, system 800 includes a low earth orbit (LEO) satellite network including a constellation of LEO satellites 810 orbiting the earth. In alternate embodiments, system 800 can include one or more medium earth orbit (MEO) satellites (not shown) and/or could include geostationary earth orbit (GEO) satellites 870 which can be utilized for broadcast of high bandwidth data, or a combination of any of the above, although LEO satellites enable the lowest transit delays to be achieved.

In a preferred embodiment, satellites are interconnected via optical intersatellite links (ISLs) 880 to provide a global communication network infrastructure. In alternate embodiments, different types of intersatellite links (e.g., RF links) can be used. ISLs 880 are not necessary in the present invention, however. In an alternative embodiment, a communication can be routed down to or up from any one of many earth-based terminals through a bent pipe configuration (not shown).

In general, LEO satellites 810, CPE 860, 862, 864, and 868, and other nodes of communication system 800 (such as gateway 866) can be viewed as a network of nodes. Desirably the constellation of LEO satellites 810 serves as a network backbone. Each node of communication system 800 is or can be in data communication with other nodes through communication links. Additionally, all nodes of communication system 800 are, or can be, in data communication with other communication devices dispersed throughout the world through public switched telephone networks (PSTN) and/or conventional terrestrial communication devices coupled to PSTN through conventional terrestrial facilities.

In a preferred embodiment, system 800 provides fixed satellite services with a variety of user data rates to a variety of types of CPE or communication terminals, including for example, small, very small, and ultra-small satellite earth terminals. System 800 also can provide high data rate connections to gateway earth terminals that interface to the PSTN. CPE, 860, 862, 864,866 and 868 can be any one of numerous devices capable of transmitting and/or receiving information or data through system 800 and can serve as either source nodes, destination nodes, or both in accordance with the present invention.

In a preferred embodiment, the network operates as a cell relay network using an ATM protocol or a similar cell relay protocol to transmit video, voice, data and the like through the network from a source CPE to destination nodes. The CPE acting as a source node desirably is capable of trunking data flow from one or more types of user equipment such as, for example, mobile or stationary telephones, radios, computer terminals, or similar devices. For example, CPE 864, serving as a corporate terminal, is adapted to trunk traffic from any number of individual items of user equipment transmitting various types of data, including for example, not only cell traffic, but also including IPv4, Ipv6, systems network architecture (SNA), and/or frame relay traffic.

SOCC 830 typically includes the processing equipment, operator stations, software and other facilities used in the launching, control, maintenance, and decommissioning of the satellites in the constellations. Satellite operations processing and communications with the constellation are accomplished from two satellite operation control centers and local and remote antenna facilities using communication channels and the inner satellite network for continuous access to any satellite in the constellation. SOCC 830 also controls the flight orbit of each satellite within the system whereby SOCC 830 receives various telemetry data regarding each satellite describing, for example, its altitude, its speed, and whether it is in the correct orbital position.

NOCC 840 includes the processing equipment, operator stations, software and other facilities that perform various network management functions. Generally, a NOCC is collocated with a SOCC and shares the communications resources and other support facilities within a MOCC 820. The routing information included in a look-up table is desirably updated multiple times a minute to account for the motion of the LEO atellites. This information for the table updates is predetermined by a outing management function in the NOCC and is block uploaded to the atellites.

In a preferred embodiment of system 800, DVNM 850 controls the service and subscriber management for the system for each individual service provider. DVNM 850 desirably is allocated a defined amount of network capacity for a predetermined time period pursuant to a negotiation process between the DVNM and the NOCC as described in further detail in co-pending application Ser. No. 09/032827 filed on Feb. 26, 1998, entitled "System And Method For Managing Network Resources," the subject matter of which is incorporated herein by reference.

System 800 is fully operational with one DVNM, but it is anticipated that a number of service providers will sell access to the system and each of these providers will have at least one of their own DVNM 850. DVNM 850 is not necessary to practice the methods of the present invention. However, in a preferred embodiment of system 800, one or more of DVNM 850 controls allocation of rights to the CPE or source node to use network capacity and/or authorizes connection attributes or limits in response to connections requests from individual subscribers. In a preferred embodiment of the present invention, a DVNM associated with a subscriber attempting to access the system through the CPE negotiates with the subscriber's CPE and creates a connection admission attributes message as described in FIG. 3 using a method such as method 200 described with reference to FIG. 5.

Desirably, each type of CPE 860, 862, 864, 866, and 868 has the ability to transmit and receive data to and from satellites 810 and/or satellites 870.

CPE 860, 862, 864, 866, and 868 provide the subscriber interfaces to system 800 and also support a variety of network management functions for the associated DVNM 850.

Figure 9:
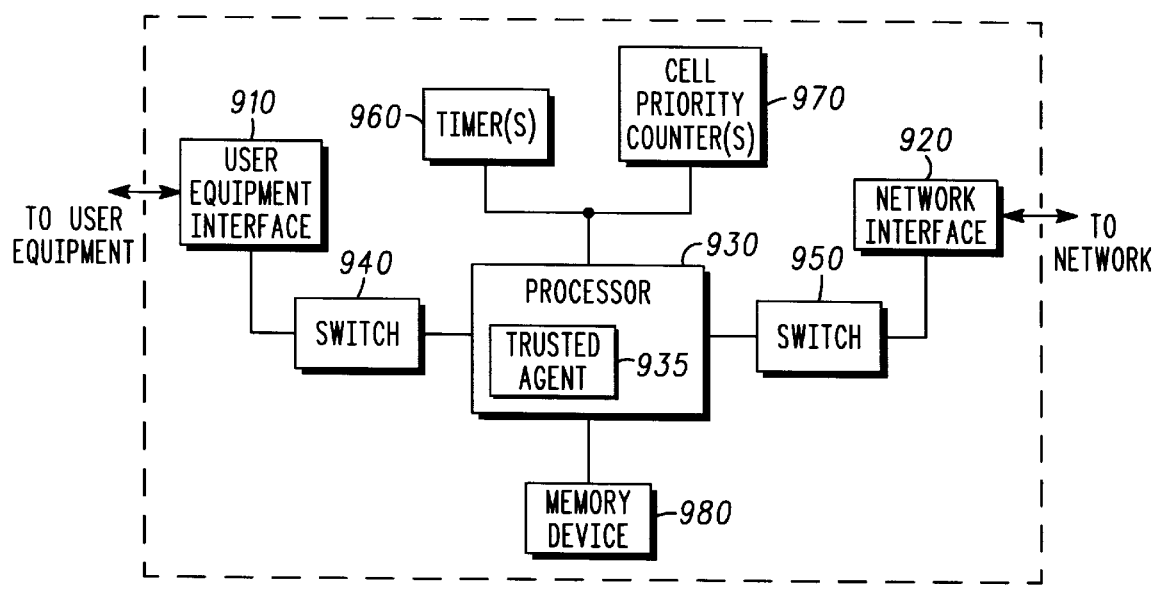
FIG. 9 illustrates a simplified block diagram of a source node in accordance with a preferred embodiment of the present invention.

FIG. 9 illustrates a simplified block diagram of a source node 900 in accordance with a preferred embodiment of the present invention. Source node 900 is representative of any source node in a cell relay network, such as, for example, source CPE 42 (FIG. 2), source node 740 of terrestrial network 700 (FIG. 7), or CPE 860, 862, 864, 866, or 868.

Source node 900 includes user equipment interface 910 which contains hardware and software for interfacing with one or more items of user equipment, such as user equipment 40 (FIG. 2) and includes means for transmitting and receiving cells to and from the user equipment through a virtual connection, such as one or more transmitters and/or receivers. Moreover, any number of items of user equipment could be in communication with source node 900 such that source node 900 serves as a trunking node for transmission of cells to the network. Alternatively, source node 900 could itself be a single item of user equipment capable of generating multiple priority traffic rather than being a trunk for other items of user equipment generating multiple priority traffic. User equipment interface 910 is in communication with processor 930 through switch 940.

Source node 900 also includes network interface 920, which contains hardware and software for interfacing with other nodes of the network. Network interface 920 also includes means such as one or more transmitters and/or receivers for transmitting and receiving cells to and from the cell relay network through a virtual connection. More specifically, network interface 920 includes means to establish through the cell relay network a virtual connection between the source node and a destination node which is the terminus of said virtual connection. network interface 920 is in communication with processor 930 through witch 950.

Processor 930 comprises hardware and software for carrying out steps 110, 120, 150, and 160 of method 100 (FIG. 4) as well as the steps of method 300 (FIG. 6). More specifically, processor 930 is adapted for generating a request for a virtual connection to the cell relay network and for creating a requisition for permission to transfer through a virtual connection during a predetermined time period cells having specific connection attributes, including multiple specified priorities. Processor 930 also includes means for receiving a connection admission attributes message 44 (FIGS. 2, 3) from the network control element.

Furthermore, processor 930 also includes trusted agent 935 or other similar means adapted for monitoring and/or enforcing one or more connection limits authorized in connection admission attributes message 44 during a predetermined time period. Trusted agent 935 includes hardware and software adapted to execute the steps of method 300 (FIG. 6).

Timer(s) 960 and one or more cell priority counter(s) 970 work in conjunction with processor 930 and, more specifically, with trusted agent 935 (or similar monitoring and enforcing means) to execute the steps of method 300. Additionally, memory device 980 is in communication with processor 930 and/or trusted agent 935. Memory device 980, which can be collocated with processor 930 and/or trusted agent 935 or located separately from these elements, also is adapted to assist in carrying out the source node related steps method 100 (FIG. 4) as well as the steps of method 300 (FIG. 6). More specifically, memory device 980 maintains information concerning the authorized limits contained in a connection admission attributes message received from a network control element.

Figure 10:
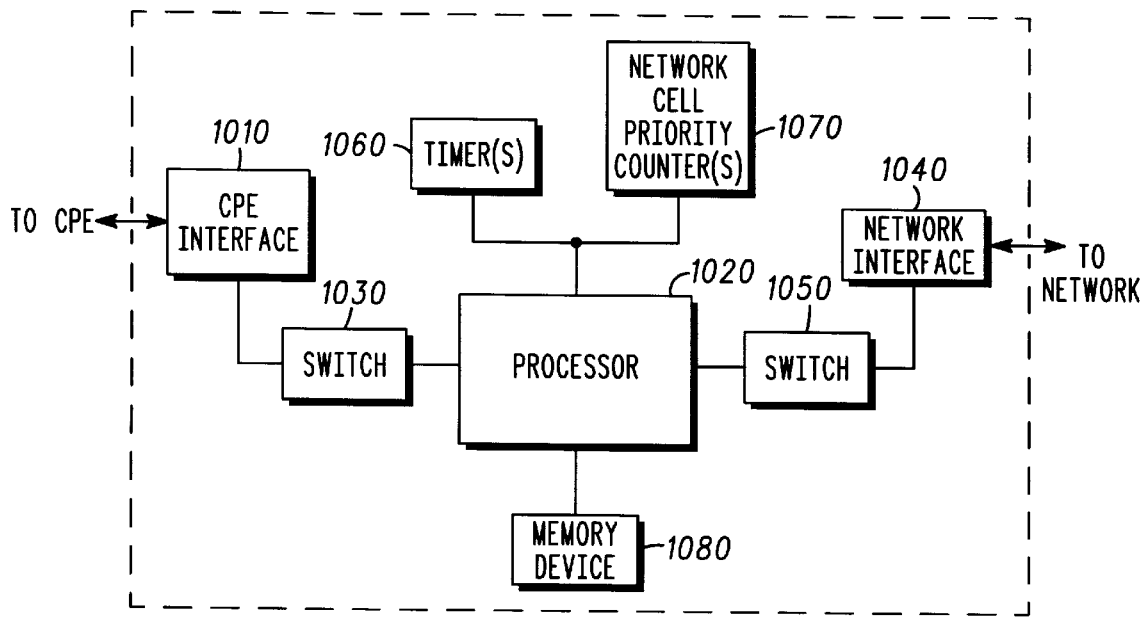
FIG. 10 illustrates a simplified block diagram of a network control element in accordance with a preferred embodiment of the present invention.

FIG. 10 illustrates a block diagram of a network control element 1000 in accordance with a preferred embodiment of the present invention. Network control element 1000 desirably is included within a node of the cell relay network which is independent from the source node. For example, in a terrestrial communication system such as the example described with reference to FIG. 7, network control element 1000 could be located within edge switch 730 (or within any other switch capable of acting as an edge switch). Moreover, in the exemplary satellite communication system described with reference to FIG. 8, network control element 1000 desirably is located within DVNM 850. Alternatively, in these exemplary communication systems or in other networks, network control element 1000 could be located in virtually any other node of the network without departing from the spirit of the present invention.

Network control element 1000 includes source node interface 1010 which comprises hardware and software for interfacing with one or more source nodes 900 (FIG. 9) and includes means such as a transmitter and/or receiver for transmitting and receiving cells to and from the source node. Any number of source nodes could be in communication with network control element 1000 through source node interface 1010. Source node interface 1010 is in communication with processor 1020 through switch 1030.

Network control element 1000 also includes network interface 1040, which contains hardware and software for interfacing with other nodes of the network. Network interface 1040 includes means for transmitting and receiving cells to and from the cell relay network through a virtual connection, such as a transmitter and/or receiver, or similar devices. Network interface 1040 is in communication with processor 1020 through switch 1050.

Processor 1020 includes hardware and software adapted for executing step 120 of method 100 (FIG. 4) as well as the steps of method 200 (FIG. 5). More specifically, processor 1020 is adapted to receive a request or a virtual connection from a source node and to receive along with the request for a connection, a requisition for permission to transfer through the virtual connection, during a predetermined time period, cells having specific connection attributes, including multiple specified priorities. Memory device 1080 is adapted to store such received items and communicate such information to processor 1020 as appropriate. Processor 1020 also includes means for determining, in response to the requisition, whether the cell relay network is able to support the requested connection attributes (primarily in terms of specified QoS priorities) specified in the requisition.

Processor 1020 further includes means for creating, in response to the requisition, a connection admission attributes message including authorized connection attributes. Such means includes hardware and software associated with processor 1020, such as one or more timer(s) 1060 and one or more network priority counters 1070 capable of assisting in the execution of the steps of method 200 as described above with reference to FIG. 5. Memory device 1080 desirably acts in communication with processor 1020 and/or network priority counter(s) 1070 to maintain information concerning the capacity of the network to transmit cells of one or more specified priorities during a predetermined time period.

Additionally, processor 1020 includes means such as one or more transmitter(s) or similar devices for transmitting the created connection admission attributes message to the appropriate source node(s) through source node interface 1010.

In summary, methods and apparatus for relaying cells having different priorities through a single virtual connection in a cell relay network have been described in detail herein. The methods and apparatus of the present invention enable achievement of congestion control in the network while also allowing in a single virtual connection trunking and transmission of cells having different priorities.

While the present invention has been described above in connection with specific methods and devices and with reference to a preferred embodiment, it is to be clearly understood that this description is made only by way of example and not as a limitation on the scope of the invention. For example, although the methods and apparatus of the present invention are described, in one embodiment, with reference to ATM networks and more specifically with reference to implementation in a specific satellite communication system, the methods and apparatus of the present invention also could be implemented in any type of communication system using a cell relay network including, for example, other wireless communication systems, terrestrial cellular systems and/or in wire-based systems which transfer data using fixed size cells. Those skilled in the art will recognize that changes and modification could be made in the preferred embodiment without departing from the scope of the present invention.

What is claimed is:

1. A method for facilitating transmission of cells having multiple priorities through a single virtual connection in a cell relay network, the method comprising the steps of:

a) transmitting a connection request for a virtual connection to said cell relay network from a source node;

b) transmitting with said connection request a requisition for permission to transfer through said cell relay network cells having multiple priorities; and c) receiving in said source node a connection admission attributes message in response to said requisition.

2. The method as claimed in claim 1, wherein said cell relay network comprises, at least in part, a terrestrial network.

3. The method as claimed in claim 1, wherein said cell relay network comprises, at least in part, a satellite constellation including at least one satellite.

4. The method as claimed in claim 1, further comprising the steps of:

d) establishing a virtual connection between said source node and a destination node of said cell relay network; and e) enforcing connection limits authorized in said connection admission attributes message.

5. The method as claimed in claim 4, wherein step e) comprises the step of enforcing a set of authorized connection attributes included in said connection admission attributes message.

6. The method as claimed in claim 4, wherein step e) comprises the steps of said source node enforcing said connection admission attributes message.

7. The method as claimed in claim 4, wherein step e) comprises the steps of:

(e1) initializing one or more cell priority counters for a first predetermined time interval;

(e2) initializing a timer adapted to monitor a duration of said first predetermined time interval; and (e3) awaiting an indication either that a cell having a specified priority has arrived and is ready for transmission or that the first predetermined time interval has expired.

8. The method as claimed in claim 7, further comprising the step of:

(e4) if, in step (e3), an indication is received that the first predetermined time interval has expired, then reinitializing said one or more cell priority counters and said timer for a second time interval.

9. The method as claimed in claim 7, further comprising the step of:

(e5) if, in step (e3), an indication is received that a cell has arrived, then determining whether transmitting said cell at a priority designation specified by said cell to said cell relay network would cause said source node to exceed said connection limits authorized in said connection admission attributes message.

10. The method as claimed in claim 9, wherein step (e5) comprises the steps of:

(e5i) if, in step (e5), a determination is made that transmitting said cell to said cell relay network would cause said source node to exceed said connection limits authorized in said connection admission attributes message, then taking corrective action to prevent said source node from exceeding said connection limits; and (e5ii) if, in step (e5), a determination is made that transmitting said cell to said cell relay network would not cause said first user's equipment to exceed said authorized limits of said connection admission attributes message, then transmitting said cell to said cell relay network.

11. The method as claimed in claim 10, wherein said corrective action comprises discarding said cell.

12. The method as claimed in claim 10, wherein said corrective action comprises transmitting said cell at an available priority other than said priority designation specified by said cell.

13. A method for facilitating transmission of cells having multiple priorities in a cell relay network, the method comprising the steps of:
   a) transmitting a connection request for a connection to said cell relay network from a source node;
   b) transmitting with said connection request a requisition for permission to transfer through said cell relay network during a time interval cells having specific attributes, including multiple priority designations;
   c) creating in said cell relay network a connection admission attributes message in response to said requisition;
   d) transmitting said connection admission attributes message to said source node;
   e) receiving in said source node said connection admission attributes message;
   f) establishing a virtual connection for transmitting cells having multiple priorities; and
   g) enforcing one or more connection limits authorized in said connection admission attributes message during said time interval.

14. The method as claimed in claim 13, wherein said connection admission attributes message comprises a data field comprising one or more cell priorities corresponding to one or more cell transmission rates for cells of said one or more cell priorities.

15. The method as claimed in claim 13, wherein step (c) comprises the steps of:
   (c1) initializing one or more network cell priority counters in a network control element associated with said cell relay network; and
   (c2) awaiting receipt of either an open connection request or a close connection request in said network control element.

16. The method as claimed in claim 15, further comprising the steps of:
   (c3) receiving in said network control element a close connection request from a first source node; and
   (c4) decrementing at least one of said network cell priority counters to reflect an increase in capacity to transmit traffic of a cell priority associated with said close connection request.

17. The method as claimed in claim 15, further comprising the steps of:
   (c3) receiving an open connection request including said requisition; and
   (c4) determining, in response to said requisition, whether said network is able to support the open connection request.

18. The method as claimed in claim 17, further comprising the step of:
   (c5) authorizing the open connection request, including said specified attributes in said requisition, in response to a determination that the cell relay network is able to support the open connection request.

19. The method as claimed in claim 17, further comprising the step of:
   (c5) taking a corrective action in response to a determination that the cell relay network is not able to support the open connection request.

20. The method as claimed in claim 19, wherein said corrective action comprises denying the open connection request.

21. The method as claimed in claim 19, wherein said corrective action comprises negotiating with the source node to establish acceptable alternative connection attributes.

22. A communication system for facilitating transmission of cells having multiple priorities in a cell relay network, the communication system comprising:
   a source node for transmitting a connection request to said cell relay network to establish a virtual connection and for transmitting with said connection request a requisition for permission to transfer through said cell relay network during a time interval cells having specific connection attributes, including multiple specified priorities;
   a destination node;
   a network fabric; and
   a network control element associated with said network fabric for receiving said connection request including said requisition and for determining, in response to said requisition, whether said cell relay network is able to support said connection request.

23. The communication system as claimed in claim 22, wherein said network control element comprises an edge switch of a terrestrial network.

24. The communication system as claimed in claim 22, wherein said cell relay network comprises, at least in part, a terrestrial wireless network.

25. The communication system as claimed in claim 22, wherein said cell relay network comprises, at least in part a terrestrial wire-based network.

26. The communication system as claimed in claim 22, wherein cell relay network comprises, at least in part, a satellite constellation including at least one satellite.

27. The communication system as claimed in claim 22, wherein said network control element comprises a distributed virtual network manager.

28. The communication system as claimed in claim 22, wherein said network control element is adapted to create a connection admission attributes message in response to said requisition, said connection admission attributes message including authorized connection attributes, and wherein said network control element is adapted to transmit said connection admission attributes message to said source node.

29. The communication system as claimed in claim 28, wherein said source node is adapted to receive said connection admission attributes message, to establish a connection between said source node and said destination node, and to enforce one or more connection limits authorized in said connection admission attributes message during a predetermined time period.

30. A source node in a communication system for facilitating transmission of cells having multiple priorities in a cell relay network, the source node comprising:
   a processor for generating a request for a connection to said cell relay network and for creating a requisition for permission to transfer through said connection during a time interval cells having specific connection attributes, including multiple specified priorities;
   means for transmitting said request and said requisition to a network control element associated with said cell relay network;

means for receiving a connection admission attributes message from said network control element;

means to establish a connection between said source node and a destination node; and a trusted agent for enforcing one or more connection limits authorized in said connection admission attributes message during said time interval.

31. A network control element in a communication system for facilitating transmission of cells having multiple priorities in a cell relay network, the network control element comprising:

means for receiving a request for a connection from a source node of said communication system, said request for a connection including a requisition for permission to transfer through said connection during a time interval cells having specific connection attributes, including multiple specified priorities;

means for determining, in response to said requisition, whether said cell relay network is able to support said requisition;

means for creating, in response to said requisition, a connection admission attributes message including authorized connection attributes; and means for transmitting said connection admission attributes message to said source node.

* * * * *